United States Patent
Neander et al.

(10) Patent No.: US 11,168,514 B2
(45) Date of Patent: Nov. 9, 2021

(54) SPACER FOR INSULATING GLAZINGS COMPRISING AN INTEGRATED RIBBON CABLE

(71) Applicant: SAINT-GOBAIN GLASS FRANCE, Courbevoie (FR)

(72) Inventors: Marcus Neander, Eschweiler (DE); Christopher Marjan, Aachen (DE); Hans-Werner Kuster, Aachen (DE); Guenael Morvan, Marseilles (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/963,717

(22) PCT Filed: Jan. 17, 2019

(86) PCT No.: PCT/EP2019/051088
§ 371 (c)(1),
(2) Date: Jul. 21, 2020

(87) PCT Pub. No.: WO2019/141749
PCT Pub. Date: Jul. 25, 2019

(65) Prior Publication Data
US 2021/0079715 A1 Mar. 18, 2021

(30) Foreign Application Priority Data
Jan. 22, 2018 (EP) .................... 18152708

(51) Int. Cl.
*E06B 3/663* (2006.01)
*E06B 3/673* (2006.01)
(Continued)

(52) U.S. Cl.
CPC ...... *E06B 3/66314* (2013.01); *E06B 3/67326* (2013.01); *E06B 3/663* (2013.01);
(Continued)

(58) Field of Classification Search
CPC .. E06B 3/66314; E06B 3/67326; E06B 3/663; E06B 3/66347; E06B 3/366;
(Continued)

(56) References Cited

U.S. PATENT DOCUMENTS

2004/0227462 A1   11/2004   Utsumi et al.
2012/0026573 A1   2/2012   Collins et al.
(Continued)

FOREIGN PATENT DOCUMENTS

CN   104067165 A   9/2014
CN   106715819 A   5/2017
(Continued)

OTHER PUBLICATIONS

Machine translation of applicant cited DE 10361184, (Year: 2005).*
(Continued)

*Primary Examiner* — Donald J Loney
(74) *Attorney, Agent, or Firm* — Pillsbury Winthrop Shaw Pittman LLP (57) ABSTRACT

A spacer with an integrated ribbon cable for insulating glazings includes a main body including two pane contact surfaces, a glazing interior surface, an outer surface, a hollow chamber, and at least one ribbon cable on the outer surface, wherein the ribbon cable is materially bonded to the outer surface.

15 Claims, 5 Drawing Sheets

(51) Int. Cl.
  *G02F 1/01* (2006.01)
  *G02F 1/00* (2006.01)
  *H01L 41/02* (2006.01)

(52) U.S. Cl.
  CPC ....... *E06B 3/66347* (2013.01); *E06B 3/66366* (2013.01); *E06B 2003/6638* (2013.01); *G02F 1/00* (2013.01); *G02F 1/0102* (2013.01); *H01L 41/02* (2013.01)

(58) Field of Classification Search
  CPC ... E06B 2003/6638; H01L 41/02; G02F 1/00; G02F 1/0102
  See application file for complete search history.

(56) References Cited

U.S. PATENT DOCUMENTS

| | | | |
|---|---|---|---|
| 2014/0247475 | A1 | 9/2014 | Parker et al. |
| 2014/0311065 | A1* | 10/2014 | Schreiber ............ E06B 3/66304 52/204.593 |
| 2017/0321472 | A1 | 11/2017 | Frank et al. |

FOREIGN PATENT DOCUMENTS

| | | | |
|---|---|---|---|
| CN | 107002451 | A | 8/2017 |
| CN | 107357107 | A | 11/2017 |
| CN | 206693883 | U | 12/2017 |
| DE | 33 30 305 | A1 | 3/1985 |
| DE | 93 13 394 | U1 | 10/1993 |
| DE | 42 35 063 | A1 | 4/1994 |
| DE | 696 07 473 | T2 | 9/2000 |
| DE | 103 61 184 | B3 | 2/2005 |
| DE | 20 2004 019 286 | U1 | 4/2006 |
| DE | 10 2008 026339 | A1 | 12/2009 |
| DE | 10 2014 119720 | A1 | 6/2016 |
| EP | 0 852 280 | A1 | 7/1998 |
| EP | 0 876 608 | B1 | 4/2002 |
| EP | 1 862 849 | A1 | 12/2007 |
| JP | 2015-506430 | A | 3/2015 |
| JP | 2016-141573 | A | 8/2016 |
| WO | WO 2005/067060 | A1 | 7/2005 |
| WO | WO 2010/112789 | A2 | 10/2010 |
| WO | WO 2010/147494 | A1 | 12/2010 |
| WO | WO 2011/033313 | A1 | 3/2011 |
| WO | WO 2012/007334 | A1 | 1/2012 |
| WO | WO 2013/104507 | A1 | 7/2013 |
| WO | WO 2013/109881 | A1 | 7/2013 |
| WO | WO 2014/198431 | A1 | 12/2014 |
| WO | WO 2015/197491 | A1 | 12/2015 |
| WO | WO 2016/091646 | A1 | 6/2016 |
| WO | WO 2016/121332 | A1 | 8/2016 |
| WO | WO 2017/106458 | A1 | 6/2017 |

OTHER PUBLICATIONS

International Search Report as issued in International Patent Application No. PCT/EP2019/051088, dated Feb. 28, 2019.
Notice of Reasons for Refusal as issued in Japanese Patent Application No. 2020-540577, dated Jun. 22, 2021.
First Office Action as issued in Chinese Patent Application No. 201980009696.5, dated Jul. 14, 2021.

* cited by examiner

Figur 5

SPACER FOR INSULATING GLAZINGS COMPRISING AN INTEGRATED RIBBON CABLE

CROSS-REFERENCE TO RELATED APPLICATIONS

This application is the U.S. National Stage of PCT/EP2019/051088, filed Jan. 17, 2019, which in turn claims priority to European patent application number 18152708.6 filed Jan. 22, 2018. The content of these applications are incorporated herein by reference in their entireties.

The invention relates to a spacer having an integrated ribbon cable, an insulating glazing including such a spacer, a method for production thereof, and use thereof.

Insulating glazings have become indispensable in building construction, especially in the wake of ever stricter environmental protection regulations. These are made of at least two panes that are joined to one another via at least one circumferential spacer. Depending on the embodiment, the space between the two panes, referred to as the glazing interior, is air- or gas-filled, but free, in any case, of moisture. Excessive moisture content in the glazing interpane space results, in particular with cold outside temperatures, in condensation of water droplets in the interpane space, which must absolutely be avoided. To absorb the residual moisture remaining in the system after assembly, desiccant-filled hollow-body spacers can be used. However, since the absorption capacity of the desiccant is limited, sealing of the system is also of enormous importance to prevent penetration of further moisture.

Beyond their basic function, insulating glazings can also contain further elements in the form of built-in components or panes with controllable additional functions. Glazings with switchable or controllable optical properties are one type of modern, active glazings. With such glazings, for example, the transmittance of light can be actively influenced as a function of an applied electrical voltage. The user can, for example, switch from a transparent to a non-transparent state of the glazing to prevent vision into the room from the outside. With other glazings, the transmittance can be infinitely adjusted, for example, to regulate the entry of solar energy into a room. Thus, undesirable heating of buildings or vehicle interiors is avoided and the energy consumption or $CO_2$ emissions caused by air conditioning systems is reduced. Consequently, active glazings are used not only for the visually appealing designing of façades and pleasant lighting in the interior, but are also advantageous from an energy and ecology standpoint.

Active glazings contain a functional element, which typically includes an active layer between two surface electrodes. The optical properties of the active layer can be changed by a voltage applied to the surface electrodes. Electrochromic functional elements, known, for example, from US 20120026573 A1 and WO 2012007334 A1 are an example of this. SPD functional elements (suspended particle device), known, for example, from EP 0876608 B1 and WO 2011033313 A1 are another example. The transmittance of visible light through electrochromic or SPD functional elements can be controlled by the voltage applied. The voltage feed is done via so-called busbars, which are usually applied to the surface electrodes and are connected to a voltage source via suitable connection cables.

When an active glazing is integrated in an insulating glazing, the voltage feed of the active glazing must be designed gas- and water-tight in order to ensure sufficient quality and service life of the insulating glazing. In WO 2017/106458 A1, the electric feed line itself is designed in shape and size such that it has high tolerance against relative movements with differing thermal expansion of the components involved. However, the feed line itself is made between the spacer and an adjacent pane through the primary sealing means used for bonding and sealing. Such a passage of cable through the edge seal of the insulating glazing always also constitutes a potential defect site.

Moreover, in practice, electrical contact is often necessary at multiple locations of the insulating glazing. The prior art connection cable is routed around the spacer frame in the outer interpane space. The spacer is bonded to the panes of the insulating glazing via a so-called primary sealant, whereas a secondary sealant is introduced into the outer interpane space, filling it and surrounding any electrical connection cables that may be present. However, automated filling of the outer interpane space in the presence of electrical connection cables has proved problematic since they can, for example, spatially obstruct a robot arm with an extrusion nozzle. Furthermore, no air bubbles must remain in the outer interpane space, for example, between the connection cable and the spacer. The volume of the enclosed air varies with changing climatic conditions and permanently results in leaks of the insulating glazing in the region of the air inclusion.

A wide variety of modifications in the region of the spacer to ensure improved tightness of insulating glazings are already known. One measure for improving the tightness of insulating glazings is the coating of polymeric spacers with metal foils or alternating metal-polymer layer systems, as disclosed, for example, in EP 0 852 280 A1 and WO 2013/104507 A1. These ensure high tightness of the spacer with, at the same time, compatibility with the sealants used for assembly. However, the problems mentioned with regard to tightness of insulating glazings with electrical feed lines are not affected thereby.

Ribbon cables are known in the field of electrical engineering and are used, for example, for electrical contacting in computers. Known to the person skilled in the art under the term "ribbon cables" are multiwire cables whose wires are routed in parallel. In contrast to a cylindrical design, ribbon cables have a substantially lower construction height. The wires of a ribbon cable can, for example, be implemented as parallel strands with insulation, with the insulation determining the shape of the cable and the distance between the wires (so-called grid dimension).

A subgroup of ribbon cables are the ribbon cables also known as flat flex cable (FFC). These also have wires running in parallel; however, the wires are implemented as metal foils. A plastic film is usually used as the insulation separating the wires. Known possible designs of FFCs include laminated ribbon cables, so-called flat laminated cable (FLC), and extruded ribbon cables, so-called flat extruded cable (FEC). In the laminated version (FLC), there is an adhesive between the metal foil and the surrounding insulation; whereas, in the extruded flat band conductors (FEC), the wires are directly surrounded by the insulation. Also known are flexible patterned circuit boards (flexible printed circuit, FPC) as another possible design that is used primarily in the case of complex conductor patterns.

Because of their space-saving design, flat flex cables (FFC) are also often used in wiring harnesses of motor vehicles. Thus, for example, DE 10 2014 119 720 A1 aims to optimize laminated ribbon cables for motor vehicles.

WO 2016 121332 A1 discloses an insulating glazing with an optical device, wherein an electrical feed line is routed through the spacer of the insulating glazing into the glazing interior and a metal strip is inserted in the edge seal of the insulating glazing within the sealant. The metal strip is electrically conductively connected to the electrical feed line.

WO 2016 091646 A1 discloses a spacer for insulating glazings in the form of a hollow profile having two hollow chambers, wherein a groove for receiving a pane runs between the two hollow chambers. The groove is equipped with a gas-permeable insert or at least two inserts spaced at least 1 mm apart, thus enabling a gas exchange between the interpane spaces of an insulating glazing.

WO 2013 109881 A2 discloses an insulating glazing having an electrochromic device, wherein the electrical feed lines in the edge seal of the insulating glazing are routed within the primary and secondary sealants.

US 2014 0247475 A1 describes insulating glazings with electrochromic devices and their electrical contacting. For routing the connection cable, a profile that has two cable receptacles in the form of a groove is inserted into the edge seal of the insulating glazing. Such an arrangement is difficult to fill with a sealant since air-filled cavities can remain due to the complex geometry of the profile.

DE 103 61 184 B3 discloses a photovoltaic insulating glass pane having a spacer frame made of a plastic profile into which a busbar is inserted. The spacer frame is not continuous in the region in which the busbar is inserted.

The object of the present invention is to provide a spacer that results in improved sealing of insulating glazings having electrical feed lines, an insulating glazing with this spacer, and an economical method for producing the insulating glazing.

The object of the present invention is accomplished according to the invention by a spacer having an integrated ribbon cable, an insulating glazing with a spacer, a method for production thereof, and use of the spacer according to the independent claims 1, 10, 11, 13, and 15. Preferred embodiments of the invention emerge from the dependent claims.

The spacer according to the invention having integrated ribbon cables for insulating glazings comprises at least a main body comprising two pane contact surfaces, a glazing interior surface, and an outer surface. The at least one ribbon cable runs on the outer surface and is directly or indirectly materially bonded to the outer surface. Here, "direct bond" means a direct connection between the ribbon cable and the main body. This occurs, for example, when the components are connected without interposition of other layers. This is the case, for example, by coextrusion, welding, or lamination without adhesive. An indirect bond is created either by bonding or laminating with the use of an adhesive or with the interposition of other components, such as a barrier film. In any case, a material, full-surface connection between the main body and the ribbon is created, with no cavities and no sealant present between the main body and ribbon cable. Cavities could result in leaks of the insulating glazing due to expansion of the air contained therein. Sealants are unsuitable for filling the intermediate space between the main body and the ribbon cable since these narrow cavities usually fill only poorly and air-filled cavities remain. In this context, "sealant" includes both the common sealants used for attaching the panes to the pane contact surfaces of the spacer (often referred to as primary sealant) and the outer seal (often referred to as secondary sealants).

The pane contact surfaces, the glazing interior surface, and the outer surface of the main body together form a circumferentially closed body. This ensures the structural integrity as well as tightness against gases and water. The main body is made either from a gas-tight material, for example, metal, or is provided with a gas- and water-tight barrier film, for example, in the case of polymeric main bodies.

The material connection of the main body and the ribbon cable enables a cavity-free connection of the ribbon cable on the spacer such that when filling the outer interpane space of the insulating glazing, no air bubbles remain in the outer seal, causing leakage of the edge seal of the insulating glazing in the event of thermal expansion of the enclosed air.

In addition, the spacer according to the invention enables industrially automated further processing of a spacer frame including the spacer according to the invention. Since the ribbon cable serving as an electric feed line is routed materially on the outer surface of the spacer, automated filling of the edge region of the glazing can be done without the electric feed line constituting an obstacle for the material nozzle guided along the outer side of the spacer.

In the context of the invention, the spacer having an integrated ribbon cable is used in particular when, for example, a voltage supply is necessary at multiple points of the insulating glazing and a connection cable according to the prior art freely routed in the outer interpane space would adversely affect automated further processing.

A substantial advantage of the invention also resides in the high degree of prefabrication of the spacer according to the invention having an integrated electrical feed line. The lines are already integrated into the spacer during the production process of the spacer such that during production of the insulating glazing, manual installation of the lines is no longer required. During production of the insulating glazing, the feed lines already present on the outer surface of the spacer only have to be contacted at the necessary points. For this purpose, the ribbon cable can, for example, make electrically conductive contact with an electrical connection cable used for connecting the electrically switchable functional element. Since manual installation of the feed lines is eliminated, the degree of automation of the production of insulating glass can be further increased. Furthermore, the position of the electric feed lines must be precisely determined since these are present not as loose cables in the edge seal but are attached to the main body in a defined position. This facilitates electrical contacting.

The first pane contact surface and the second pane contact surface are the sides of the spacer, on which the outer panes (first pane and second pane) of an insulating glazing are mounted at the time the spacer is installed. The first pane contact surface and the second pane contact surface run parallel to one another.

The glazing interior surface is defined as the surface of the spacer main body which points in the direction of the interior of the glazing after incorporation of the spacer in an insulating glazing. The glazing interior surface is between the first and the second pane.

The outer surface of the spacer main body is the side opposite the glazing interior surface that faces away from the interior of the insulating glazing in the direction of an outer seal.

The outer surface of the spacer can, in a possible embodiment, be angled in each case adjacent the pane contact surfaces, resulting in increased stability of the main body. The outer surface can be angled adjacent the pane contact surfaces, for example, by 30 to 60° in each case, relative to the outer surface.

In a preferred embodiment, the material connection between the spacer and the ribbon cable is achieved by gluing, welding, lamination, or coextrusion of the main body and the ribbon cable.

When gluing the main body to the ribbon cable, an adhesive is applied at least on the outer side of the main body and the ribbon cable is inserted into the moist adhesive. By pressing on the ribbon cable, possible air inclusions between and the ribbon cable are removed. Gluing the components constitutes the technically simplest variant for connecting the main body and the ribbon cable since this is possible in production using simple means without making major investments. Suitable adhesives from, for example, the group of hot melt adhesives, polyurethane adhesives, and/or methyl methacrylate adhesives.

If the main body and the ribbon cable are to be welded, this is preferably done by ultrasonic welding. The ribbon cable is placed on the outer surface of the main body and a sonotrode is attached to weld the components. This is advantageous because a material bond can be achieved without additional components, such as adhesive. Furthermore, the strength is higher than with glued connections.

For laminating the main body and the ribbon cable, these components are placed together and subjected to a lamination process. Optionally, an adhesive can be inserted between the layers to be laminated. If the adjacent layers to be laminated are thermoplastic materials, an adhesive is not necessary, but can optionally be used. If a plastic layer is to be laminated with a metal layer (for example, a metallic main body), an adhesive is preferably used. Adhesives suitable for this are, for example, polyimide, polyester, and modified epoxy adhesives. These are highly inert relative to chemical influences and have good electrical insulation properties.

In the case of coextrusion of the main body and the ribbon cable, the ribbon cable is already inserted therein at the beginning of the extrusion process such that the spacer, for example, in the form of a polymeric main body, is extruded directly onto the ribbon cable which ends up on the outer surface of the spacer.

The ribbon cable introduced, according to the invention, on the outer surface of the spacer is a single-wire or multiwire cable, whose wires are routed in parallel. As a result, the ribbon cable has a substantially lower structural height than the cylindrical connection cables commonly used in the outer interpane space. In the context of the invention, all common ribbon cables are suitable due to their flat design. Because of their flat design, ribbon cables rest flush against the outer surface of the spacer with a material bond thereto without causing any air inclusions between the main body and the cable or, after filling, to the side of the cable.

In a possible embodiment, the ribbon cable comprises multiple parallel strands. These are preferably surrounded by insulation that spaces the strands relative to one another and ensures the dimensional stability of the cable in addition to its insulating properties. The round shape of the adjacent strands results in a structured, corrugated surface of a ribbon cable including stranded conductors. In light of this, a ribbon cable including stranded conductors is preferably attached to the outer surface of the spacer by means of an adhesive since the adhesive fills the cavities created by the corrugated surface.

In the context of the invention, the ribbon cable used preferably belongs to the group of flat band conductors, a special type of ribbon cable. Flat band conductors are also known under the terms foil conductors, flexible flat cables, or flat conductors. Particularly common is the internationally used expression flat flex cable (FFC). These also have parallel wires, implemented, however, as metal foils. Depending on the application, the flat band conductor can even include a single-wire.

Flat band conductors are commercially available in various designs with one or a plurality of wires implemented as metal foils. Usually, they include insulation in the form of a plastic film surrounding the at least one wire. The connection of the conductor (metal foil strip) and the insulation (plastic film) is done by lamination (so-called flat laminated cable (FLC)) or extrusion (so-called extruded flat band conductors (FEC)). In the laminated form (FLC), there is an adhesive between the metal foil and the surrounding insulation; whereas in extruded flat cables (FEC), the wires are directly surrounded by the insulation. These flat band conductors already sheathed with an insulating plastic film of both types can preferably be mounted with an adhesive, by welding techniques (e.g., ultrasonic welding), or lamination on the outer side of the spacer. In this way, an existing spacer can easily be retrofitted with a flat band conductor. Since flat band conductors have metal films instead of strands, the installation height of the cables can be further reduced. Moreover, flat band conductors have a flat surface such that the risk of air inclusions is further reduced.

Patterned circuit boards (so-called flexible printed circuits (FPC)) are another form of flat band conductor. These are used in alternative embodiments of the invention, for example, when a complex conductor structure with multiple branches is desired.

Flat band conductors preferably contain copper and/or copper alloys. Alternatively, other electrically conductive materials can also be used. Examples include aluminum, gold, silver, or tin as well as alloys thereof.

The electric feed line preferably has a a conductor cross-section of 0.08 mm$^2$ to 2.5 mm$^2$.

Examples of foil conductors are described in DE 42 35 063 A1, DE 20 2004 019 286 U1, and DE 93 13 394 U1.

Flat band conductors are preferably made of a tinned copper strip with a thickness from 0.03 mm to 0.45 mm and a width from 0.2 mm to 6.6 mm. Copper has proven successful for such conductor tracks since it has good electrical conductivity as well as good processability into foils. At the same time, material costs are low.

In the context of the invention, flat band conductors with a thickness of 0.1 mm to 0.45 mm and a width of 1.0 mm to 7.0 mm are particularly preferably used. This ensures both good electrical contactability and sufficient current carrying capacity. The rectangular cross-section created within these dimensions is also advantageous for ensuring a sufficiently large connection surface on the main body over the width of the ribbon cable and only a low installation height due to the low thickness of the ribbon cable.

If the flat band conductor includes multiple conductor tracks, the so-called grid dimension is another important parameter for describing the flat band conductor. The grid dimension refers to the distance between two parallel conductor tracks, each measured from the center of the tracks, and is 0.5 mm to 2.54 mm for common flat band conductors.

In the context of the invention, a wide variety of spacer main bodies known to the person skilled in the art can be used since the solution according to the invention is compatible with any spacers.

In a possible embodiment, the spacer according to the invention is an injection-moldable thermoplastic spacer made of a sealing material. Such spacers are known, for example, from DE 696 07 473 and WO 2015/197491 A1 and are usually extruded directly into the interpane space of an insulating glazing. A ribbon cable can, for example, be glued or welded to the outer side of the extruded main body. Injection-moldable thermoplastic spacers usually contain a desiccant in the injection-moldable sealing material.

In a possible embodiment, the insulating glazing according to the invention has a spacer with a polymeric or metallic main body including at least one hollow chamber. A suitable spacer with a polymeric main body is disclosed, for example, in WO 2013/104507 A1.

Hollow profile spacers known to the person skilled in the art contain at least one hollow chamber in a usually polymeric or metallic main body. The hollow chamber is adjacent the glazing interior surface, with the glazing interior surface situated above the hollow chamber and the outer surface of the spacer situated below the hollow chamber. In this context, "above" is defined as facing the inner interpane space of the insulating glazing; and "below", as facing away from the pane interior.

The hollow chamber of the spacer results in a weight reduction in comparison with a solidly formed spacer and is available to accommodate additional components, for instance, a desiccant.

In a preferred embodiment of the invention, the main body is a metallic main body. This has the advantage that metallic spacers are gas-tight and no barrier films are needed to seal the outer surface of the spacer. The metallic main body is preferably made of aluminum or stainless steel, particularly preferably aluminum. In the case of metallic main bodies, there is electrical insulation between the main body and the electrical conductor of the ribbon cable, which prevents a short-circuit between an electrical conductor and the electrically conductive metallic main body. The insulation can, for example, consist of insulation (e.g., a plastic film) already surrounding the ribbon cable before connection to the main body. This has the advantage that the ribbon cable can be applied on the main body without additional measures for insulation. Preferably, this is done by gluing, laminating, or welding. If a ribbon cable without insulation has to be applied to the main body, insulation must be provided between the ribbon cable and the main body at the time of the joining of the components. This can be done, for example, by gluing using a non-conductive adhesive (specific resistance of at least $10^8$ $\Omega$cm). Lamination with the aid of such an adhesive is also possible. A ribbon cable without insulation is preferably a metal foil strip. These can be cut economically from a metal foil, with a possible cost savings in comparison with commercially available flat band conductors with insulation. The surface of the metal foil strip facing away from the outer surface of the spacer can optionally be provided with insulation. In a possible embodiment of the invention, no further insulating layer is applied on the metal foil strip. For example, an electrical connection cable can be connected directly to the flat band conductor without first having to remove the insulation in this region. After incorporation of the spacer in an insulating glazing, the outer interpane space in the vicinity of the metal foil strip is filled with an outer seal which acts as insulation.

In another preferred embodiment of the spacer, the spacer includes a polymeric main body. This is advantageous since the thermal conductivity of plastics is significantly lower than the thermal conductivity of metals. Furthermore, the plastic of the polymeric main body has a specific resistance of at least $10^8$ $\Omega$cm and is, consequently, non-conductive for electric current. This is particularly advantageous, since, in this case, no further insulation is required between the main body and an electrical conductor of the ribbon cable. Also, in this case, a ribbon cable, preferably a flat band conductor, with or without outer insulation can be applied to the polymeric main body. The resultant advantages have already been described. The ribbon cable can be glued, welded, laminated, or coextruded with the polymeric main body. In the case of coextrusion of the main body and the ribbon cable, a metal strip is preferably introduced into the extrusion process and the polymeric main body is extruded onto the metal strip. This is advantageous since a flat band conductor is thus integrated into the spacer without additional process steps and fully automated integration of the ribbon cable occurs.

The use of spacers with a polymeric main body has proved to be particularly advantageous, since, in this case, all the above-mentioned methods for material bonding, such as coextrusion, gluing, welding, and lamination can easily be carried out on the main body itself or also on or within a barrier film of the main body. Furthermore, important core functions of the edge seal, such as gas- and water-tightness, low heat transfer coefficient, accommodation of desiccant and feed lines for electrical contacting are made available in the form of a single component. This simplifies the production of the insulating glazing considerably.

If the ribbon cable includes insulation, this has a specific resistance greater than or equal to $10^8$ $\Omega$cm. The insulation preferably includes polyvinyl chloride, polyether naphthalate, polyethylene, polyimide, rubber, polyurethane, and/or polymers from the group of polyesters. Polyester insulations are both economical and environmentally compatible and are used primarily in the form of a film surrounding the flat band conductor.

If the spacer according to the invention has a polymeric main body, further measures for improving the gas tightness of the main body can be provided. Preferably, a gas- and vapor-tight barrier is applied at least on the outer surface of the polymeric main body, preferably on the outer surface and on a part of the pane contact surfaces. The gas- and vapor-tight barrier improves the tightness of the spacer against gas loss and moisture penetration. Preferably, the barrier is applied on approx. one-half to two-thirds of the pane contact surfaces. A suitable spacer with a polymeric main body is disclosed, for example, in WO 2013/104507 A1.

In a preferred embodiment, the gas- and vapor-tight barrier on the outer surface of a polymeric spacer is implemented as a film. This barrier film contains at least one polymeric layer as well as a metallic layer or a ceramic layer. The layer thickness of the polymeric layer is between 5 μm and 80 μm, whereas metallic layers and/or ceramic layers with a thickness of 10 nm to 200 nm are used. Within the layer thicknesses mentioned, particularly good tightness of the barrier film is achieved. The barrier film can be applied on the polymeric main body, for example, by gluing. Alternatively, the film can be coextruded together with the main body.

The barrier film particularly preferably contains at least two metallic layers and/or ceramic layers arranged alternatingly with at least one polymeric layer. The layer thicknesses of the individual layers are preferably as described in the preceding paragraph. Preferably, the outer layers are formed by the polymeric layer. In this arrangement, the metallic layers are particularly well protected against damage. The alternating layers of the barrier film can be bonded or applied on one another by a large variety of known prior art methods. Methods for depositing metallic or ceramic layers are well known to the person skilled in the art. The use of a barrier film with an alternating layer sequence is particularly advantageous in terms of the tightness of the system. A defect in one of the layers does not result in functional loss of the barrier film. In comparison, even a small defect in a single layer can result in a complete failure. Furthermore, the application of multiple thin layers is advantageous in comparison with one thick layer, since the risk of internal adhesion problems increases with increasing layer thickness. Also, thicker layers have higher conductivity such that such a film is less suitable thermodynamically.

The polymeric layer of the film preferably includes polyethylene terephthalate, ethylene vinyl alcohol, polyvinylidene chloride, polyamides, polyethylene, polypropylene, silicones, acrylonitriles, polyacrylates, polymethylacrylates, and/or copolymers or mixtures thereof. The metallic layer preferably includes iron, aluminum, silver, copper, gold, chromium, and/or alloys or oxides thereof. The ceramic layer of the film preferably contains silicon oxides and/or silicon nitrides.

In an alternative preferred embodiment, the gas- and vapor-tight barrier is preferably implemented as a coating. The coating contains aluminum, aluminum oxides, and/or silicon oxides and is preferably applied by a PVD method (physical vapor deposition). This can significantly simplify the manufacturing process since the polymeric main body is provided with the barrier coating immediately after manufacture, for example, by extrusion, and no separate step is necessary for applying a film. Coating with the materials mentioned provides particularly good results in terms of tightness and, additionally, exhibits excellent properties of adhesion to the materials of the outer seal used in insulating glazings.

In a particularly preferred embodiment, the gas- and vapor-tight barrier has at least one metallic layer or ceramic layer that is implemented as a coating and contains aluminum, aluminum oxides, and/or silicon oxides and is preferably applied by a PVD method (physical vapor deposition).

The polymeric main body preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. Particularly good results are achieved with these materials.

The polymeric main body is preferably glass-fiber-reinforced. The coefficient of thermal expansion of the main body can be varied and adjusted by means of the selection of the glass fiber content in the main body. By adjusting the coefficient of thermal expansion of the polymeric main body and the barrier film or barrier coating, temperature-induced tensions among the various materials and spalling of the barrier film or coating can be avoided. The main body preferably has a glass fiber content of 20% to 50%, particularly preferably of 30% to 40%. At the same time, the glass fiber content in the polymeric main body improves strength and stability.

In another preferred embodiment, the polymeric main body is filled with hollow glass spheres or glass bubbles. These hollow glass spheres have a diameter of 10 µm to 20 µm and improve the stability of the polymeric hollow profile. Suitable glass spheres can be obtained commercially under the tradename "3M™ Glass Bubbles". The polymeric main body particularly preferably contains polymers, glass fibers, and glass spheres. An admixture of glass spheres results in improvement of the thermal properties of the hollow profile.

The ribbon cable can also be integrated directly into a spacer with the polymeric main body via the gas- and vapor-tight barrier film. Flat band conductors are preferably used due to their low overall height.

In a first preferred embodiment, a ribbon cable is integrated between the outer surface of the polymeric main body and the gas- and vapor-tight barrier film. Here, for example, at least one metal foil conductor can be applied to the main body before attaching the gas- and vapor-tight barrier film, and the gas- and vapor-tight barrier can be placed on the metal foil conductor such that a polymeric layer is adjacent the metal foil conductor. Thus, the mere arrangement of the components already provides electrical insulation of the electrical conductor relative to its surroundings. When a ribbon cable is to be placed in the vicinity of a metallic layer of the barrier film, insulation or an insulating adhesive is provided between the metallic layer and the electrical conductor of the ribbon cable. The integration of a ribbon cable between the main body and the barrier film has the advantage that no separate process step is required for integration of the ribbon cable; and it can be glued, welded (preferably by ultrasonic welding), laminated, or coextruded with the main body at the same time as the barrier film.

In a second preferred embodiment, the ribbon cable, here again, preferably a flat band conductor due to its structural height, runs within the gas- and vapor-tight barrier film and preferably adjacent two polymeric layers. With regard to the connection of the components, the details described for the first embodiment apply. The second preferred embodiment is advantageous since, for example, during gluing, laminating, or welding of the barrier film and of the main body, the ribbon cable is already integrated into the barrier film. Thus, the ribbon cable does not have to be interposed as an individual component, but is provided together with the barrier film.

In a third preferred embodiment, the ribbon cable is attached to the surface of the gas- and vapor-tight barrier film facing away from the outer surface of the main body. With regard to possible joining techniques, the necessity of insulation of the electrical conductor, and other details, the statements concerning the first and second preferred embodiment apply. The third embodiment is advantageous since, when contacting the electrical conductor, the gas- and vapor-tight barrier film does not have to be removed at points in the region of the contacting. Removing the film involves the risk of also damaging adjacent regions of the outer surface and thus causing the spacer to leak. Furthermore, in this embodiment, the ribbon cable can also be implemented as a metal foil strip that is not insulated at least on one surface. This is applied on the main body with the barrier film such that the surface without insulation faces in the direction of the outer interpane space, thus eliminating the need to strip the electrical conductor.

Particularly preferably, the ribbon cable according to the first, second, or third embodiment described is glued or laminated on the polymeric main body together with the barrier film, or in the case of coextrusion of the polymeric main body and the barrier film, is integrated within the barrier film or on one of the surfaces of the barrier film in the layer stack.

The ribbon cable preferably extends over a length of at least 10 cm, particularly preferably at least 20 cm, in particular at least 30 cm along the outer surface of a spacer frame composed of the spacer according to the invention. The advantages of the invention come into play particularly when longer sections of a feed line lying freely in the outer interpane space can be avoided since these are particularly cumbersome in the further processing of the insulating glazing.

The ribbon cable is suitable for making contact with a voltage supply and an electrical load. After mounting the spacer according to the invention in an insulating glazing, the voltage supply is positioned outside the glazing interior; and the electrical load, within the glazing interior.

The ribbon cable is preferably contacted by means of at least one electrical connection cable in each case with the electrical load and the voltage source. Various cable forms suitable as electrical connection cables are known to the person skilled in the art. The at least one electrical connection cable can, for example, be implemented as a stranded conductor or a flat band conductor, preferably as a flat band conductor. The flat band conductors applied on the outer side of the main body in a preferred embodiment are very well suited for use as electrical connection cables due to their flat design. After assembly of an insulating glazing with a spacer according to the invention, an electrical connection cable can, for example, be routed along the first or second pane contact surface into glazing interior. A flat design of the connection cable is advantageous here in order to obtain the greatest possible layer thickness of the sealant connecting the panes and spacer, even at the point where the connection cable is inserted into the glazing interior. Furthermore, a flat band conductor as an electrical connection cable rests very flat against the outer surface of the main body even at the contacting point between the connection cable and the ribbon cable running on the outer surface. Preferably, all electrical connection cables and the ribbon cable running on the outer surface of the main body are implemented as flat band conductors (including metal foils). This is advantageous for achieving, all in all, the flattest possible structure as well as optimal electrical contacting.

The at least one electrical connection cable is electrically conductively connected to the ribbon cable situated on the outer surface of the spacer by soldering, gluing using an electrically conductive adhesive, welding (e.g., ultrasonic welding) or or by other methods known to the person skilled in the art for connecting electrical conductors.

Preferably, insulation of the ribbon cable is removed in the region in which the contacting of the electrical connection cable is to occur. Suitable methods for removing the insulation are sufficiently known to the person skilled in the art. These include, for example, mechanical methods such as scraping, grinding, and milling, or even thermal methods, such as thermal stripping with process gas or thermal stripping by laser methods (for example, using a $CO_2$ laser).

In a possible embodiment, the at least one electrical connection cable makes contact with the ribbon cable via an electrically conductive contact pin, for example, a metal pin, which is pressed into the spacer in the region of the ribbon cable. The connection cable is connected to the contact pin by means of common methods for electrical contacting. Contacting via a contact pin pressed into the outer surface is, in particular, advantageous with the use of polymeric main bodies with barrier films. In this case, removal of any electrical insulation that is present, which can be associated with undesirable damage to the barrier film, is eliminated.

In a particularly preferred embodiment, the spacer is a double spacer that can accommodate at least one additional pane in a groove. These are used, for example, for triple glazings in which the third pane is inserted in a groove between the first pane and the second pane. Such spacers are known from WO 2014/198431 A1, among others.

The double spacer comprises a main body with a first pane contact surface and a second pane contact surface extending parallel thereto, a glazing interior surface, and an outer surface. The basic structure corresponds to the spacer described for double glazings. The glazing interior surface is subdivided by the groove into two sub-regions. The first hollow chamber and a second hollow chamber that are separated from one another by the groove are optionally introduced into the main body. The first hollow chamber is adjacent a first sub-region of the glazing interior surface, while the second hollow chamber is adjacent a second sub-region of the glazing interior surface, with the glazing interior surface situated above the hollow chambers and the outer surface situated below the hollow chambers. In this context, "above" is defined as facing the pane interior of an insulating glazing with a spacer according to the invention and "below" as facing away from the pane interior. Since the groove extends between the first glazing interior surface and the second glazing interior surface, it delimits them laterally and separates the first hollow chamber and the second hollow chamber from one another. The lateral flanks of the groove are formed by the walls of the first hollow chamber and the second hollow chamber. Alternatively, the space beside the groove can also be solid instead of hollow chambers. The groove forms a depression suitable for accommodating the middle pane (third pane) of an insulating glazing. The position of the third pane is thus defined by two lateral flanks of the groove and the bottom surface of the groove. A first and a second pane can be mounted on the first and second pane contact surface of the spacer.

The routing of the ribbon cable on the outer surface of a double spacer and the details of its design are analogous to the already described details of the spacer without a groove. In the case of a spacer for triple or multiple insulating glazings, there is, however, an additional possibility for inserting an electrical connection cable into the glazing interior. An electrical connection cable can not only be routed along the first or second pane contact surface into the glazing interior, but can also be inserted into the groove. This is advantageous because in this manner, an electrically switchable functional element situated on the third pane of an insulating glazing can be electrically contacted within the groove, invisible to the viewer.

Optionally, the groove of a double spacer according to the invention includes an insert. The insert prevents slippage of the pane and resultant development of noise during the opening and closing of the window. The insert also compensates for thermal expansion of the third pane during warming such that, regardless of the climatic conditions, tension-free fixing is ensured. The insert can be recessed in the region of the electrical contacting in order to provide the space necessary for the contacting.

In a particularly preferred embodiment of the invention, the spacer is a spacer for triple glazings including at least one groove for accommodating a third pane, wherein the groove includes an entry opening, preferably in the bottom surface of the groove. This is advantageous because the entry opening is not visible to the viewer in the installed state of the spacer and, at the same time, the bonding of the spacer to the adjacent panes is not affected by a cable that passes through.

Preferably, the groove includes a contact element that makes electrically conductive contact with an electrically switchable functional element of the third pane. Particularly preferably, the contact element protrudes through the entry opening of the groove and exits from the spacer on its outer surface. This part of the contact element is, consequently, situated in the immediate vicinity of the ribbon cable located on the outer side of the main body and can thus be contacted thereby in a simple manner via an electrical connection cable.

Preferably, the glazing interior surface of the spacer has at least one opening. Preferably, a plurality of openings are made in the glazing interior surface. The total number of openings depends on the size of the insulating glazing. The openings connect the hollow chambers to the inner interpane space, enabling a gas exchange between them. This allows absorption of atmospheric humidity by the desiccant situated in the hollow chamber and thus prevents fogging of the panes. The openings are preferably implemented as slits, particularly preferably as slits with a width of 0.2 mm and a length of 2 mm. The slits ensure optimum air exchange without desiccant being able to penetrate out of the hollow chambers into the inner interpane space.

The spacer preferably has, along the pane contact surfaces, a height of 5 mm to 15 mm, particularly preferably of 5 mm to 10 mm.

The width of the glazing interior surface, or the width of the sub-regions of the glazing interior surface, which defines the distance between two adjacent panes of the insulating glazing, is 4 mm to 30 mm, preferably 8 mm to 16 mm.

The invention further includes an insulating glazing with a spacer according to the invention. The insulating glazing comprises at least a first pane, a second pane, and a spacer according to the invention having a ribbon cable surrounding the panes.

The glazing interior of the insulating glazing is situated adjacent the glazing interior surface of the spacer. On the other hand, the outer surface of the spacer is adjacent the outer interpane space. The first pane is attached to the first pane contact surface of the spacer; and the second pane, to the second pane contact surface of the spacer.

In the glazing interior of the insulating glazing, there is an electrically switchable functional element, whose voltage supply is to be provided via the ribbon cable situated on the outer surface of the spacer. For this purpose, the ribbon cable makes contact with the voltage supply at one point via an electrical connection cable, and is electrically conductively connected at at least one other point, via an electrical connection cable, to the electrically switchable functional element in the glazing interior. The various wires of the ribbon cable can, for example, be used for separating different polarities.

The first and the second pane are attached to the pane contact surfaces preferably via a sealant that is applied between the first pane contact surface on the first pane and/or the second pane contact surface and the second pane.

The sealant preferably contains butyl rubber, polyisobutylene, polyethylene vinyl alcohol, ethylene vinyl acetate, polyolefin rubber, polypropylene, polyethylene, copolymers, and/or mixtures thereof.

The sealant is preferably introduced into the gap between the spacer and the panes with a thickness of 0.1 mm to 0.8 mm, particularly preferably 0.2 mm to 0.4 mm.

The outer interpane space of the insulating glazing is preferably filled with an outer sealant. This outer sealant serves primarily for bonding the two panes and and thus for mechanical stability of the insulating glazing.

The outer seal preferably contains polysulfides, silicones, silicone rubber, polyurethanes, polyacrylates, copolymers, and/or mixtures thereof. Such materials have very good adhesion to glass such that the outer sealant ensures secure bonding of the panes. The thickness of the outer sealant is preferably 2 mm to 30 mm, particularly preferably 5 mm to 10 mm.

The outer seal can also serve to insulate the ribbon cable relative to the environment. This is the case when no separate insulation is applied on the outer side of the surface of the ribbon cable facing away from the spacer. This is advantageous since the ribbon cable can be contacted with electrical connection cables without first having to remove any insulation. The isolation of the assembly relative to the environment thus does not occur until the filling of the outer interpane space. When selecting the material of the outer seal, it may be necessary to consider the magnitude of the voltage applied in order to select a sealing material with adequate insulating properties. The electrical resistance of the sealing materials mentioned is known from the literature such that the person skilled in the art can make such an assessment with little effort. However, many of the switchable functional elements common in glazings require only low voltages such that sufficient insulation is usually possible with all the materials mentioned without problems.

Depending on the design of the electrically switchable functional element, there can be a plurality of ribbon cables or wires of cable of different polarity that make contact with the electrically switchable functional element at different positions.

The actual functional element having electrically switchable optical properties is formed at least by two electrically conductive layers and one active layer. The electrically conductive layers form surface electrodes. By applying a voltage to the surface electrodes, or by changing the voltage applied to the surface electrodes, the optical properties of the active layer, in particular the transmittance and/or the scattering of visible light can be influenced.

The electrically conductive layers are preferably transparent. The electrically conductive layers preferably contain at least a metal, a metal alloy, or a transparent conductive oxide (TCO). The electrically conductive layers preferably contain at least one transparent conductive oxide.

The electrically conductive layers preferably have a thickness of 10 nm to 2 μm, particularly preferably of 20 nm to 1 μm, most particularly preferably of 30 nm to 500 nm, and in particular of 50 nm to 200 nm. Thus, advantageous electrical contacting of the active layer is achieved.

The electrically conductive layers are intended to be electrically conductively connected to at least one external voltage source in order to serve as surface electrodes of the switchable functional element.

The actual switchable functional element can, in principle, be any functional element having electrically switchable properties known per se to the person skilled in the art. The design of the active layer depends on the type of functional element.

In an advantageous embodiment of the invention, an electrochromic functional element is contained in the inner interpane space. Here, the active layer of the multilayer film is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable active layers contain, for example, at least tungsten oxide or vanadium oxide. Electrochromic functional elements are known, for example, from WO 2012007334 A1, US 20120026573 A1, WO 2010147494 A1, and EP 1862849 A1.

In another advantageous embodiment of the invention, a PDLC functional element (polymer dispersed liquid crystal) is placed in the inner interpane space. The active layer contains liquid crystals that are, for example, embedded in a polymer matrix. When no voltage is applied to the surface electrodes, the liquid crystals are randomly oriented, resulting in strong scattering of the light passing through the active layer. When a voltage is applied to the surface electrodes, the liquid crystals align themselves in one common direction and the transmittance of light through the active layer is increased. Such a functional element is known, for example, from DE 102008026339 A1.

In another advantageous embodiment of the invention, the insulating glazing contains an electroluminescent functional element in the inner interpane space. The active layer contains electroluminescent materials that can be inorganic or organic (OLED). Applying a voltage on the surface electrodes excites the luminescence of the active layer. Such functional elements are known, for example, from US 2004227462 A1 and WO 2010112789 A2.

In another advantageous embodiment of the invention, the electrically switchable functional element is an SPD functional element (suspended particle device). The active layer contains suspended particles that are preferably embedded in a viscous matrix. The absorption of light by the active layer can be varied by applying a voltage on the surface electrodes, which results in a change in orientation of the suspended particles. Such functional elements are known, for example, from EP 0876608 B1 and WO 2011033313 A1.

In addition to the active layer and the electrically conductive layers, the electrically switchable functional element can, of course, have other layers known per se, for example, barrier layers, blocking layers, anti-reflection or reflection layers, protective layers, and/or smoothing layers.

The electrically switchable functional element can, alternatively, also include an electrically heatable coating, a photovoltaic coating integrated into the insulating glazing, and/or a thin-film transistor-based liquid crystal display (TFT-based LCD).

The electrically switchable functional element can be arranged at any desired point within the inner interpane space. Preferably, the electrically switchable functional element is situated on one of the surfaces of the panes of the insulating glazing situated in the inner interpane space.

In the case of a double glazing, the electrically switchable functional element is preferably attached to the surface of the first pane and/or the second pane facing the inner interpane space.

Particularly preferably, the insulating glazing according to the invention is a triple or multiple insulating glazing. In this case, the electrically switchable functional element is preferably applied on the third pane or additional other panes that are arranged between the first pane and the second pane.

In a particularly preferred embodiment of the invention, the insulating glazing includes at least three panes and a double spacer with a groove, in whose groove the third pane is inserted. The first and the second pane rest against the pane contact surfaces. In this case, the electrically switchable functional element is applied to one of the surfaces of the third pane. The electrical contacting between the ribbon cable and the electrically switchable functional element is done in a particularly advantageous manner via a contact element passing through the outer surface of the spacer. Alternatively, an electrical connection cable can also be routed into the groove through the entry opening and connected there to the contact element. However, routing the contact element out of the groove is simpler since the contact element usually has higher mechanical rigidity than the connection cable. Furthermore, electrical contacting between the connection cable and the contact element on the outer surface of the spacer is easier to implement than within the groove, due to space considerations. The electrical contacting of the functional element via the contact element is situated completely within the groove and not visible to the observer after assembly of the insulating glazing.

The electrical connection of the contact element and the electrically conductive layers of the functional element is preferably done by so-called busbars, for example, strips of an electrically conductive material or electrically conductive imprints to which the electrically conductive layers are connected. The busbars are used to transfer electrical power and enable homogeneous voltage distribution. The busbars are advantageously produced by printing a conductive paste. The conductive paste preferably contains silver particles and glass frits. The layer thickness of the conductive paste is preferably from 5 µm to 20 µm.

In an alternative embodiment, thin and narrow metal foil strips or metal wires that preferably contain copper and/or aluminum are used as busbars; in particular, copper foil strips with a thickness of approx. 50 µm are used. The width of the copper foil strips is preferably 1 mm to 10 mm. The electrical contact between an electrically conductive layer of the functional element serving as a surface electrode and the busbar can be established, for example, by soldering or by gluing with an electrically conductive adhesive.

In an advantageous embodiment of the invention, a third pane having an electrically switchable functional element is inserted into the groove of a double spacer, with a busbar printed along the pane edge of the third pane. The busbar is dimensioned such that, after insertion of the pane into the groove of the spacer, the busbar is completely concealed by the groove.

Accordingly, the height of the busbar, measured perpendicular to the nearest pane edge, is the height of the groove of the spacer minus the distance between the busbar and the nearest pane edge. Preferably, the groove has a height of 3 mm to 10 mm, particularly preferably 3 mm to 6 mm, for example, 5 mm, and the height of the busbar is 2 mm to 9 mm, preferably 2 mm to 5 mm. The distance from the busbar to the nearest pane edge is, for example, 1 mm.

Thus, even when using busbars, it is possible to make contact that is invisible to the observer within the groove. Alternatively, the busbar can still be positioned in the visible region of the pane and can be as far from the nearest pane edge as desired. Optionally, the busbar can be concealed by decorative elements, for example, a screen print.

Preferably, the double spacer with a groove has a polymeric main body, by which means a short-circuit between current-carrying components within the groove of the spacer and a metallic main body of the spacer is avoided. Alternatively, a metallic main body can also be used, provided appropriate insulation that prevents direct contact of the metallic main body with current-carrying components is inserted into the groove of the metallic main body. However, this is complex in the manufacturing process and entails potential sources of defects such that the use of polymeric main bodies is preferred, also in light of their further advantages in terms of reduced thermal conductivity.

Electrical contacting between an electrical connection cable and a busbar can either be indirect via contact elements or direct. Contact elements are used to achieve the best possible connection to the busbar in terms of mechanical stability of the connection and minimization of an undesirable voltage drop. Suitable means for electrically conductively fixing the contact element to the busbar are known to the person skilled in the art, for example, by soldering or gluing by means of a conductive adhesive.

Preferably, the contact element is implemented as a spring contact. This is particularly advantageous since this way there is a reversible connection of the contact element and the busbar, and the electrical contact between the contact element and the busbar is already made immediately by insertion of the pane carrying the busbar into the groove of the spacer.

The first pane, the second pane, and/or the third pane of the insulating glazing preferably contain glass, particularly preferably quartz glass, borosilicate glass, soda lime glass, and/or mixtures thereof. The first and/or second pane of the insulating glazing can also include thermoplastic polymeric panes. Thermoplastic polymeric panes preferably include polycarbonate, polymethyl methacrylate, and/or copolymers and/or mixtures thereof. Additional panes of the insulating glazing can have the same composition as mentioned for the first, second, and third pane.

The first pane and the second pane have a thickness of 2 mm to 50 mm, preferably 2 mm to 10 mm, particularly preferably 4 mm to 6 mm, with the two panes possibly even having different thicknesses.

The first pane, the second pane, and other panes can be made of single-pane safety glass, thermally or chemically toughened glass, float glass, extra-clear low-iron float glass, colored glass, or laminated safety glass including one or more of these components. The panes can have any other components or coatings desired, for example, low-E layers or other solar protection coatings.

The outer interpane space, delimited by the first pane, the second pane, and the outer surface of the spacer, is filled at least partially, preferably completely, with an outer seal. Very good mechanical stabilization of the edge seal is thus achieved. Furthermore, the seal surrounds the pressure equalization body and protects it against mechanical influences from the outside.

Preferably, the outer seal contains polymers or silane-modified polymers, particularly preferably organic polysulfides, silicones, room-temperature-vulcanizing (RTV) silicone rubber, peroxide-vulcanizing silicone rubber, and/or addition-vulcanizing silicone rubber, polyurethanes, and/or butyl rubber.

The sealant between the first pane contact surface and the first pane, or between the second pane contact surface and the second pane, preferably contains a polyisobutylene. The polyisobutylene can be a cross-linking or non-cross-linking polyisobutylene.

The insulating glazing is optionally filled with a protective gas, preferably with a noble gas, preferably argon or krypton, which reduce the heat transfer value in the insulating glazing interpane space.

In principle, a wide variety of geometries of the insulating glazing are possible, for example, rectangular, trapezoidal, and rounded shapes. For producing round geometries, the spacer can, for example, be bent in the heated state.

At the corners of the insulating glazing, the spacers are linked to one another, for example, via corner connectors. Such corner connectors can be implemented, for example, as molded plastic parts with a seal, in which two spacers abut. The ribbon cables of two spacers plugged together via a corner connector can be connected in the corner region, for example, via an electrical connection cable running in the outer interpane space.

In another preferred embodiment, the spacer is not separated at the corners of the glazing and connected at the required angle by corner connectors, but, instead, is bent into the corresponding corner geometry under heating. This is advantageous since, in this way, there is a continuous ribbon conductor all around along the edge of the glazing. The electric feed line is thus secured, even in the corner region.

The invention further includes a method for producing an insulating glazing according to the invention comprising the steps:

a) Providing a spacer having an integrated ribbon cable,
b) Attaching the spacer between a first pane and a second pane via a pane contact surface of the spacer in each case by means of a sealant and introducing an electrically switchable functional element into the glazing interior,
c) Pressing the pane assembly,
d) Introducing an outer seal into the outer interpane space.

In step b), the ribbon cable is electrically conductive contacted by the electrically switchable functional element. For this purpose, a section of the ribbon cable makes contact with the electrically switchable functional element via an electrical connection cable.

The electrically switchable functional element is introduced into the glazing interior at the same time as the attaching of the panes in step b) since it is usually attached on one of the surfaces of the panes located in the interior of the insulating glazing after assembly.

The bonding of the panes to the pane contact surfaces per step b) can be carried out in any order desired. Optionally, the bonding of the two panes to the pane contact surfaces can also be done simultaneously.

In step d), the outer interpane space is at least partially, preferably completely, filled with an outer seal. The outer seal is preferably extruded directly into the outer interpane space, for example, in the form of a plastic sealing compound.

Preferably, the glazing interior between the panes is filled with a protective gas before the pressing of the assembly (step c)).

If the glazing to be produced is a multiple glazing with a double spacer including at least one groove, at least a third pane is inserted into the groove of the spacer before step b).

The invention further includes the use of a spacer according to the invention in insulating glazings including electrically switchable functional elements, particularly preferably in double or triple insulating glazings, in particular in double or triple insulating glazings including an SPD, a PDLC, an electrochromic, or an electroluminescent functional element. In all these glazings having electrically switchable components, a voltage supply into the glazing interior is necessary such that an electric feed line has to be routed from the outer interpane space into the glazing interior, which is significantly improved by the use of the spacer according to the invention.

The invention is explained in detail in the following with reference to drawings. The drawings are purely schematic representations and not to scale. They in no way restrict the invention. They depict.

Figure 1:
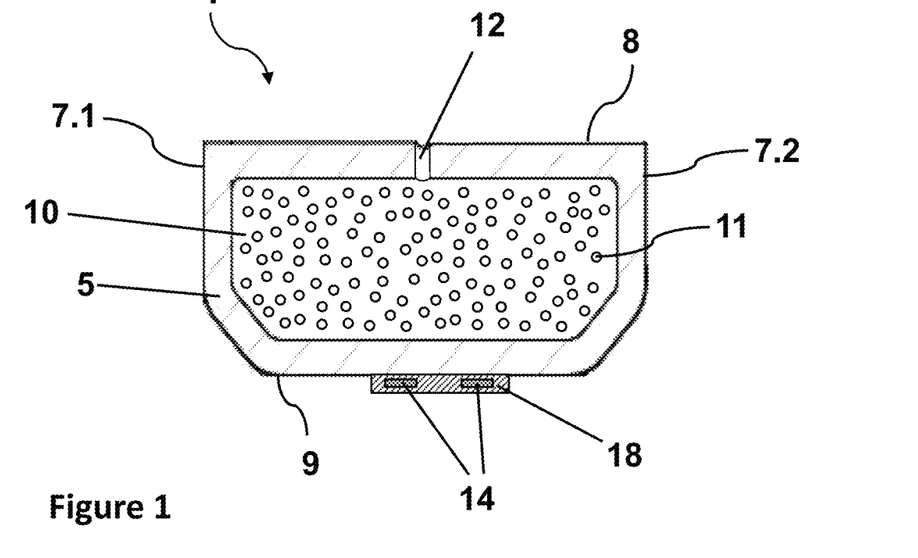
FIG. 1 a schematic representation of the spacer according to the invention in cross-section, FIG. 2*a* a schematic representation of an insulating glazing according to the invention in cross-section, FIG. 2*b* the insulating glazing according to the invention of FIG. 2*a* in an overall view, FIG. 3*a* a detailed view of the outer side of a spacer according to the invention with water- and vapor-tight barrier film and integrated flat band conductors, FIG. 3b a detailed view of the outer side of a spacer according to the invention with water- and vapor-tight barrier film and flat band conductors applied thereon, FIG. 4 an embodiment of a triple insulating glazing according to the invention with a double spacer in cross-section, FIG. 5 a flow chart of a possible embodiment of the method according to the invention.

FIG. 1 depicts a schematic representation of the spacer I according to the invention comprising a metallic main body 5 and a ribbon cable 14 on the outer side of the main body 5. The metallic main body 5 is a hollow body profile comprising two pane contact surfaces 7.1 and 7.2, a glazing interior surface 8, an outer surface 9, and a hollow chamber 10. The main body 5 is made of aluminum. The outer surface 9 has an angled shape, wherein the sections of the outer surface adjacent the pane contact surfaces 7.1 and 7.2 are inclined at angle of 30° relative to the pane contact surfaces 7.1 and 7.2. This improves the stability of the main body 5. The hollow body 10 is filled with a desiccant 11. Molecular sieve is used as the desiccant 11. The glazing interior surface 8 of the spacer I has openings 12, which are made at regular intervals circumferentially along the glazing interior surface 8 to enable gas exchange between the interior of the insulating glazing and the hollow chamber 10. Thus, any atmospheric moisture present in the interior is absorbed by the desiccant 11. The openings 12 are implemented as slits with a width of 0.2 mm and a length of 2 mm. The ribbon cable 14 is designed as a two-wire flat band conductor in the form of a flat laminated cable (FLC) consisting of two copper foil strips surrounded by insulation 18 made of polyethylene terephthalate and applied to the outer side 9 of the spacer I. The current-carrying wires of the flat band conductor 14 are surrounded by the insulation 18, which both insulates the wires relative to one another and relative to the main body 5 and the environment. The ribbon cable 14 is attached by means of a hotmelt adhesive, which materially bonds the outer surface 9 of the spacer I to the insulation 18.

Figure 2A:
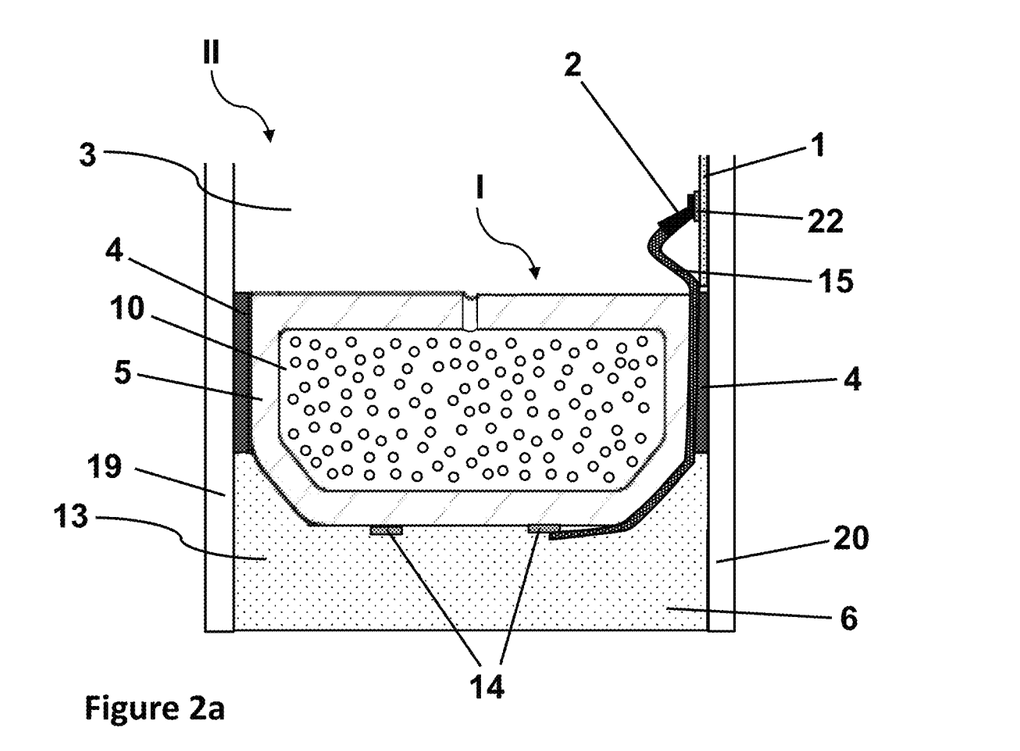

FIG. 2a depicts an insulating glazing II according to the invention with a spacer I according to the invention. The spacer I according to the invention is mounted circumferentially between a first pane 19 and a second pane 20 via a sealant 4. The sealant 4 connects the pane contact surfaces 7.1 and 7.2 of the spacer I to the panes 19 and 20. The glazing interior 3 adjacent the glazing interior surface 8 of the spacer I is defined as the space delimited by the panes 19, 20 and the spacer I. The outer interpane space 13 adjacent the outer surface 9 of the spacer I is a strip-shaped circumferential section of the glazing, which is delimited on one side each by the two panes 19, 20 and on another side by the spacer I and its fourth edge is open. The glazing interior 3 is filled with argon. A sealant 4 that seals the gap between pane 19, 20, and spacer I is introduced in each case between a pane contact surface 7.1 or 7.2 and the adjacent pane 19 or 20. The sealant 4 is polyisobutylene. On the outer surface 9, an outer seal 6, which serves to bond the first pane 19 and the second pane 20, is applied in the outer interpane space 13. The outer seal 6 is made of silicone. The outer seal 6 ends flush with the pane edges of the first pane 19 and the second pane 20. On the pane facing the glazing interior 3, the second pane 20 has an electrically switchable functional element 1 that is equipped with a busbar 22 for the electrical contacting of the functional element 1. The electrically switchable functional element 1 is an electrochromic layer. The spacer I basically corresponds to that described in FIG. 1. In contrast thereto, it is a spacer with a polymeric main body 5. The polymeric main body 5 contains styrene acrylonitrile (SAN) and approx. 35 wt.-% glass fiber. A barrier film (not shown) that reduces the heat transfer through the polymeric main body 5 into the glazing interior is applied on the outer surface 9 of the spacer I. The barrier film comprises four polymeric layers made of polyethylene terephthalate with a thickness of 12 μm and three metallic layers made of aluminum with a thickness of 50 nm. The metallic layers and the polymeric layers are placed alternatingly in each case, with the two outer layers formed by polymeric layers. In contrast to FIG. 1, the ribbon cable 14 of FIG. 2a is designed in the form of two copper foil strips as wires without further insulation. Since the outer layer of the barrier film is formed by a polymeric layer, and this is non-conductive for the electrical current, no insulation of the ribbon cable 14 is necessary. The outer seal 6 made of silicone inserted in the outer interpane space 13 also serves as electrical insulation against the environment. The ribbon cable 14 is contacted by an electrical connection cable 15, shown in cross-section per FIG. 2a. The connection cable 15 is soldered on one wire of the ribbon cable 14 and thus makes electrically conductive contact. The two wires of the ribbon cable have different polarities. The electrical connection cable 15 is guided starting from the ribbon cable 14 along the second pane contact surface 7.2 of the spacer I within the sealant 4 and enters the glazing interior 3. The electrical connection cable 15 is contacted there via a contact element 2 with the busbar 22. The contact element 2 is a so-called crimp connector, wherein the connection between an electrical connection cable 15 and the contact element 2 is made by squeezing the cable in the crimp connector, and the opposite end of the crimp connector is soldered to the busbar 22.

As a result of the conductor routing of the ribbon cable 14 materially bonded to the outer surface 9, the outer interpane space 13 is largely free of conductor lines such that unobstructed automated filling can be done with the outer seal 6.

Figure 2B:
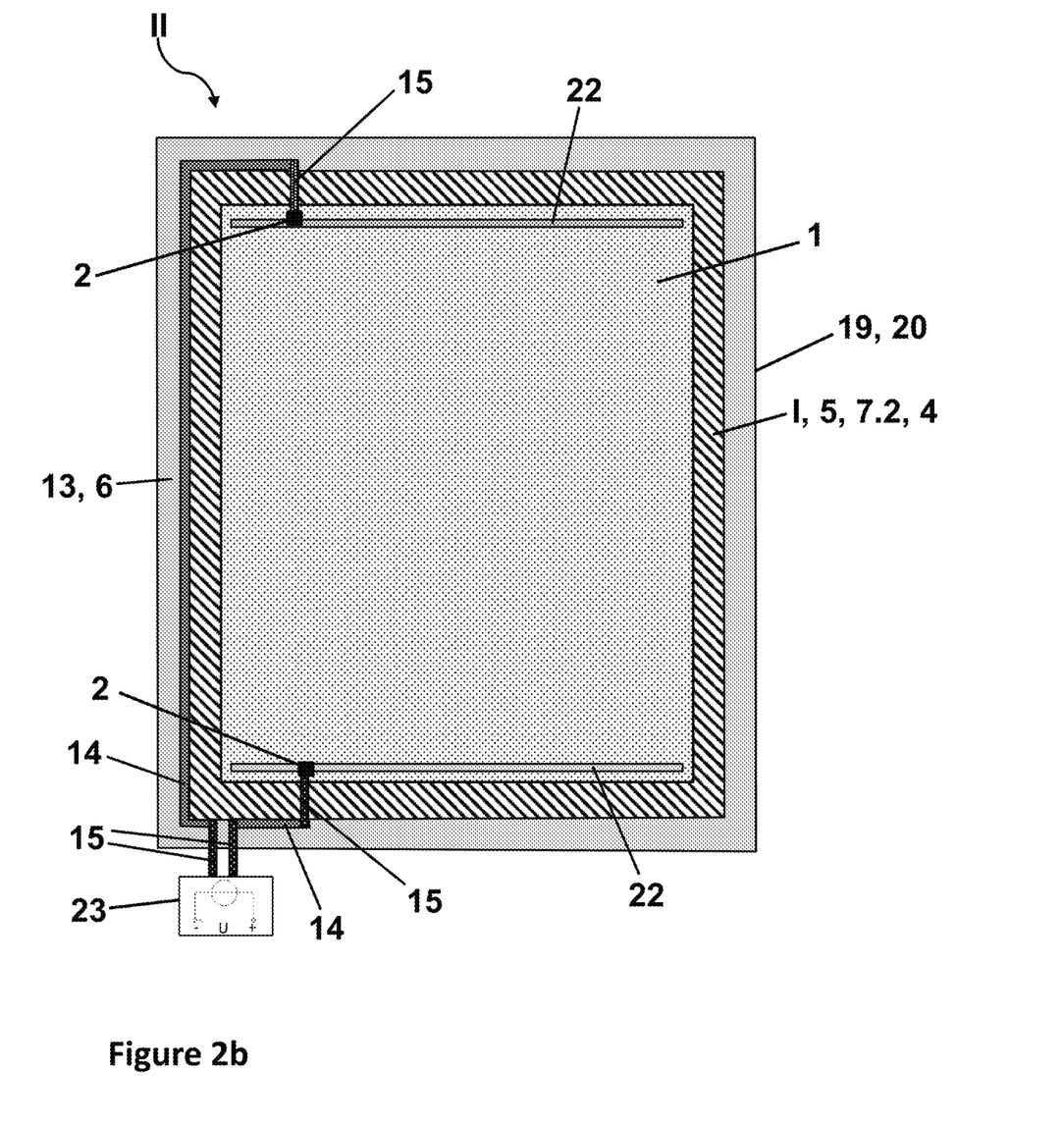

FIG. 2b depicts an overall view of the insulating glazing II according to the invention per FIG. 2a. The contacting described in FIG. 2a of a ribbon cable 14 running on the outer surface 9 of the spacer I with the busbar 22 of the electrically switchable functional element 1 takes place at two opposite edges of the insulating glazing II, with wires of the ribbon cable 14 of opposite polarity contacted at both edges, in each case via an electrical connection cable 15. As described in FIG. 2a, at both edges, an electrical connection cable 15 enters the glazing interior 3 along the second pane contact surface 7.2 and makes electrically conductive contact with the busbar 20 via a contact element 2. The spacer I is bent at the corners of the insulating glazing II such that the ribbon cable 14 is continuous on the outer side 9 of the spacer I even at the corners of the glazing. The two wires of the ribbon cable 14 are respectively connected near one another to another electrical connection cable 15 and thereby to a voltage source 23. The voltage source 23 is a DC voltage source for operating the electrochromic functional element 1 and is situated outside the glazing. The electrical connection cables 15 contacted in each case to one wire of the flat band conductor 14 are connected to different poles of the voltage source such that a difference in potential develops between the two opposite busbars 22. The voltage applied on the busbars 22 causes ion migration within the active layer of the electrochromic functional element, which influences its transmittance. The ribbon cable 14 surrounds the main body 5 along its entire circumference, since one spacer I, which was already provided with an integrated ribbon cable 14, was used for producing the spacer frame. For the sake of clarity, in FIG. 2a, only the sections of the ribbon cable 14 used for connecting the electrochromic functional element 1 are shown.

Figure 3A:
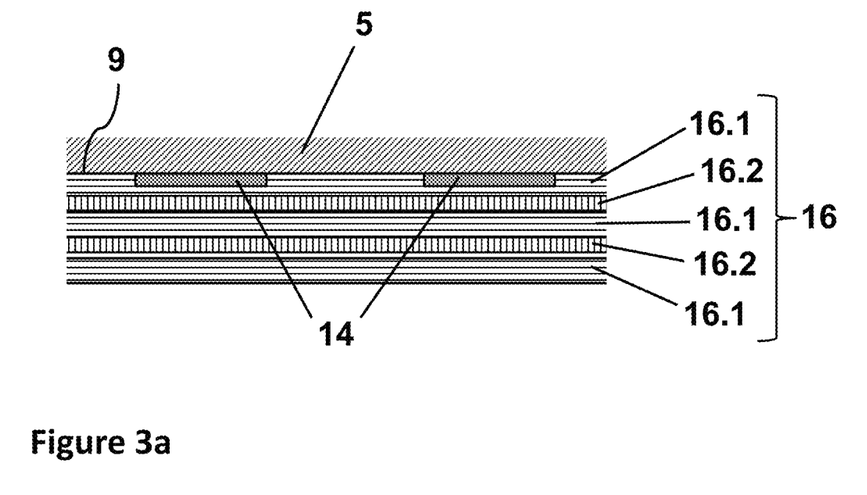
Figure 3B:
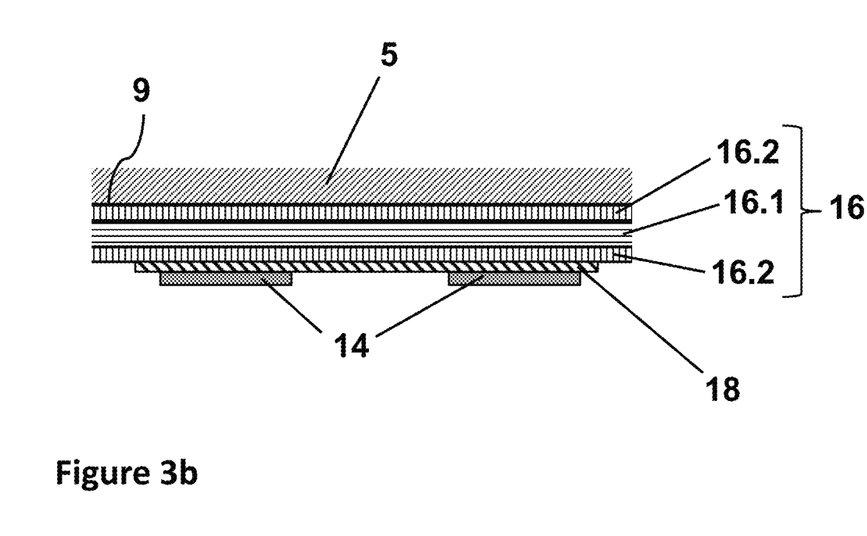

FIGS. 3a and 3b depict a detail of the water- and vapor-tight barrier film 16 on the outer side 9 of a polymeric main body 5 of the spacer I according to the invention, wherein ribbon cables 14 comprising in each case two wires made of copper foil conductors are attached at different points of the barrier film 16. The spacer I corresponds in its geometry and material composition to that described in FIG. 2a. A water- and vapor-tight barrier film, which reduces the heat transfer through the polymeric main body 5 into glazing interior, is applied on the outer surface 9 of the spacer I of FIGS. 3a and 3b. The barrier film 16 of FIG. 3a includes three polymeric layers 16.1 of polyethylene terephthalate with a thickness of 12 μm and three metallic layers 16.2 of aluminum with a thickness of 50 nm. The metallic layers 16.2 and the polymeric layers 16.1 are in each case applied alternatingly, with the two outer layers formed by polymeric layers 16.1. The ribbon cable 14 is laminated onto the main body 5 together with the water- and vapor-tight barrier film 16 (FIG. 3a). The copper foil strips of the ribbon cable 14 are placed on the main body 5, covered by the layers of the barrier film 16, and laminated onto the main body 5 together with the barrier film with the help of an adhesive. The polymeric layer 16.1 adjacent the main body 5 encloses the ribbon cable 14 and, together with the polymeric main body 5, ensures electrical insulation of the ribbon cable relative to the environment. In accordance with FIG. 3b, the barrier film 16 comprises two metallic layers 16.2, which are applied to both surfaces of a polymeric layer 16.1. The ribbon cable 14 is applied to the surface of the barrier film 16 facing the outer interpane space, with insulation 18 applied between the adjacent metallic layer 16.2 and the ribbon cable 14. The insulation 18 is formed by an adhesive layer, here, a polyurethane adhesive. The adhesive layer is applied to the barrier film 16 and the ribbon cable 14 is inserted into the not yet cured adhesive layer. The adhesive layer serves as electrical insulation of the ribbon cable 14 against the metallic layer 16.2 underneath it.

Figure 4:
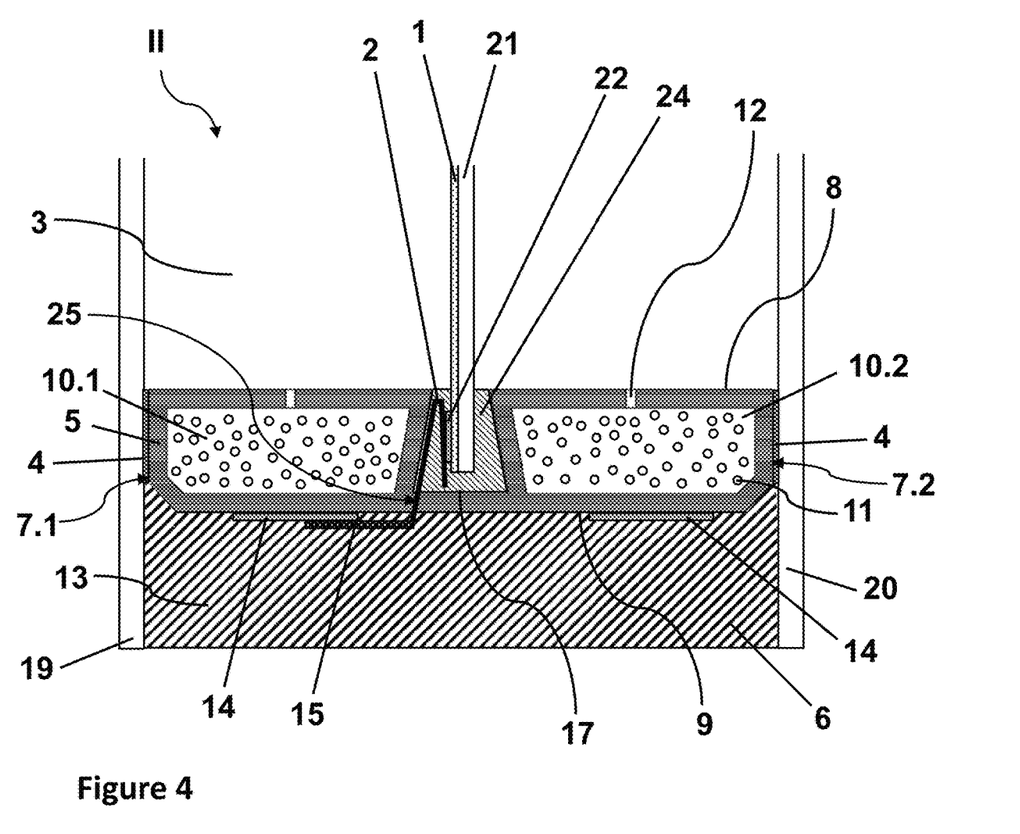

FIG. 4 depicts an embodiment of a triple insulating glazing according to the invention with a double spacer, in cross-section. The basic structure of the insulating glazing II corresponds to that described in FIGS. 2a and 2b. In contrast thereto, the polymeric main body 5 has a groove 17 between the first pane contact surface 7.1 and the second pane contact surface 7.2, wherein there is a first hollow chamber 10.1 between the groove 17 and the first pane contact surface 7.1; and a second hollow chamber 10.2, between the groove 17 and the second pane contact surface 7.2. The side flanks of the groove 17 are formed by the walls of the two hollow chambers 10.1 and 10.2, whereas the bottom surface of the groove 17 is directly adjacent the outer surface 9. The groove 17 runs parallel to the pane contact surfaces 7. A third pane 21, which carries, on one pane surface, an electrically switchable functional element 1, here, also an electrochromic functional element with a busbar 22, is inserted into the groove 17 of the spacer I. In the groove 17, there is a contact element 2, which is implemented as a spring contact. The contact element 2 is already mounted in the groove 17 before insertion of the third pane 21. In the bottom surface of the groove 17, there is an entry opening 25 in the form of a drilled hole. This is created before inserting the contact element 2 such that the contact element 2 can be inserted into it and the contact element protrudes through the main body 5 all the way to the outer surface. The third pane 21 is inserted into the groove 17 such that the busbar 22 points in the direction of the contact element 2. At the time of insertion of the third pane 21, the spring contact is pressed against the busbar 22, thus creating the desired electrical contact. The groove 17 further contains an insert 24, which surrounds the edge of the third pane 21 and fits flush in the groove 17. The insert 24 is made of ethylene-propylene-diene rubber and is recessed in the region of the contact element 2. The insert 24 fixes the third pane 21 without tension and compensates for thermal expansion of the pane. In addition, the insert 24 prevents development of noise due to slippage of the third pane 21. The insulating glazing II according to the invention of FIG. 3 enables electrical contacting of the electrically switchable functional element that is invisible to the observer, with the busbar 22 also positioned completely within the groove 17 and concealed thereby.

Figure 5:
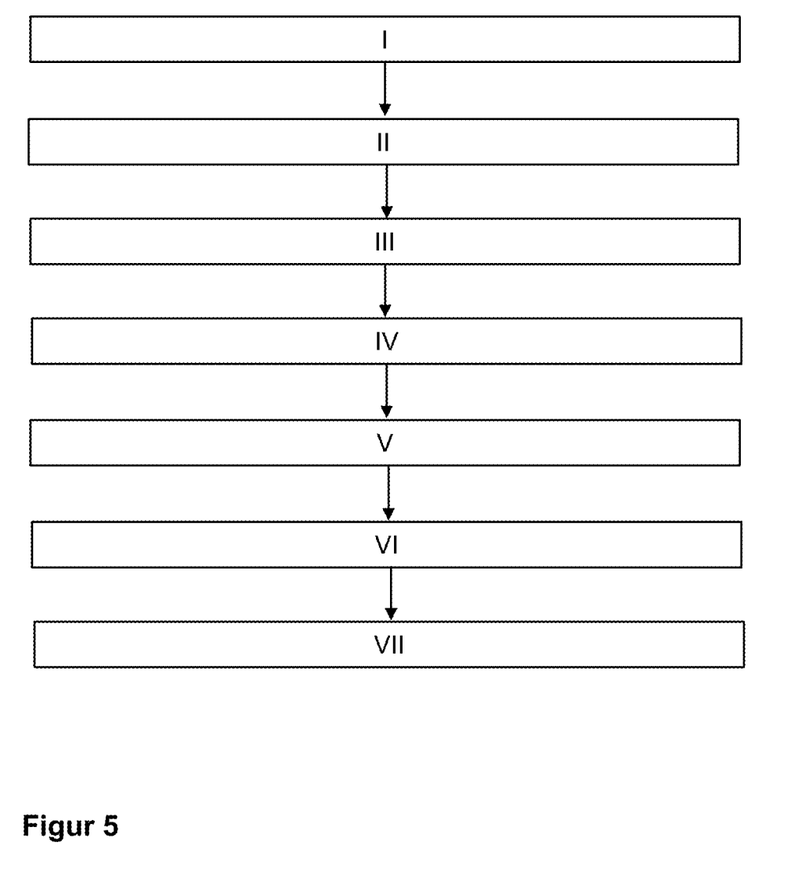

FIG. 5 depicts a flow chart of a possible embodiment of the method according to the invention comprising the steps:

I Providing a polymeric spacer I with an integrated ribbon cable 14,
II Prefabricating a circumferential spacer frame,
III Electrical contacting of at least one electrical connection cable 15 to one wire of the ribbon cable 14,
IV Mounting a pane with an electrically switchable functional element 1 on the spacer I and making electrical contact of an electrical connection connection cable 15 and the functional element 1,
V Mounting at least one more pane on the spacer,
VI Pressing the pane assembly, and
VII Inserting an outer seal 6 into the outer interpane space 13.
S In step IV, in the case of a double glazing, a first pane 19 or a second pane 20 with an electrochromic functional element is attached to a pane contact surface 7 of the spacer I via a sealant 4. The electrochromic functional element faces in the direction of the subsequent glazing interior 3. In step V, the second pane 20 is then mounted on the still available pane contact surface 7, likewise by a sealant 4.

In the case of a triple glazing with a double spacer, in step IV, a third pane 21 is inserted into the groove 17 of the spacer I; and in step V, the first and the second pane 19 and 20 are mounted on the pane contact surfaces 7 via a sealant 4.

LIST OF REFERENCE CHARACTERS

I spacer
II insulating glazing
1 electrically switchable functional element
2 contact element
3 glazing interior
4 sealant
5 polymeric main body
6 outer seal
7 pane contact surfaces
7.1 first pane contact surface
7.2 second pane contact surface
8 glazing interior surface
9 outer surface
10 hollow chambers
10.1 first hollow chamber
10.2 second hollow chamber
11 desiccant
12 openings
13 outer interpane space
14 ribbon cable
15 electrical connection cable 16 gas- and vapor-tight barrier film
16.1 polymeric layer of the gas- and vapor-tight barrier film
16.2 metallic or ceramic layer of the gas- and vapor-tight barrier film
17 groove
18 electrical insulation
19 first pane
20 second pane
21 third pane
22 busbar
23 voltage source
24 insert
25 entry opening

The invention claimed is:

1. A spacer with an integrated ribbon cable for insulating glazings comprising:
   a polymeric main body comprising two pane contact surfaces, a glazing interior surface, an outer surface, and
   at least one ribbon cable on the outer surface,
   wherein the ribbon cable is materially bonded to the outer surface, integrated directly via a gas- and vapor-tight barrier film, which is applied at least on the outer surface of the polymeric main body, and
   wherein the ribbon cable is integrated between the outer surface of the polymeric main body and the gas- and vapor-tight barrier film,
   or the ribbon cable runs within the gas- and vapor-tight barrier film,
   or the ribbon cable is attached to a surface of the gas- and vapor-tight barrier film facing away from the outer surface of the main body.

2. The spacer according to claim 1, wherein the ribbon cable is glued, welded, or laminated to the outer surface of the spacer, or coextruded therewith.

3. The spacer according to claim 1, wherein the ribbon cable includes at least one wire in the form of a metal foil.

4. The spacer according to claim 1, wherein the gas- and vapor tight barrier film contains an alternating sequence of metallic layers and polymeric layers.

5. The spacer according to claim 1, wherein the ribbon cable is laminated together with the barrier film onto the polymeric main body, or the ribbon cable is applied on the polymeric main body by coextrusion of the polymeric main body and the barrier film.

6. The spacer according to claim 1, wherein the spacer includes a groove for receiving a pane, which extends parallel to the first pane contact surface and the second pane contact surface.

7. An insulating glazing comprising a first pane and a second pane, a circumferential spacer according to claim 1 surrounding the first and second panes, and
   an electrically switchable functional element in the glazing interior,
   wherein
   the first pane rests against a first pane contact surface of the two pane contact surfaces,
   the second pane rests against a second pane contact surface of the two pane contact surfaces,
   an electrical connection cable makes electrically conductive contact with the ribbon cable,
   the electrical connection cable runs between the first pane and the second pane contact surface or between the second pane and the second pane contact surface and enters the glazing interior, and
   the electrical connection cable makes electrically conductive contact with the electrically switchable functional element in the glazing interior.

8. An insulating glazing comprising a first pane, a second pane and a third pane, a circumferential spacer according to claim 6 surrounding the first, second and third panes, and an electrically switchable functional element on at least one surface of the third pane
   wherein
   the first pane rests against a first pane contact surface of the two pane contact surfaces,
   the second pane rests against a second pane contact surface of the two pane contact surfaces,
   the third pane is inserted into the groove of the spacer,
   an electrical connection cable makes electrically conductive contact with the ribbon cable, and
   the electrical connection cable makes electrically conductive contact with the electrically switchable functional element via an entry opening in the bottom surface of the groove.

9. The insulating glazing according to claim 7, wherein the electrical connection cable makes electrically conductive contact with the electrically switchable functional element via a contact element.

10. A method for producing an insulating glazing according to claim 7, comprising
    a) providing a spacer having an integrated ribbon cable,
    b) attaching the spacer by means of a sealant via the first and second pane contact surfaces between the first pane and the second pane, and inserting an electrically switchable functional element into the glazing interior so as to form an assembly,
    c) pressing the assembly, and
    d) introducing an outer seal into an outer interpane space,
    wherein, in step b), the ribbon cable makes electrically conductive contact with the electrically switchable functional element.

11. The method according to claim 10, wherein, before step b), a third pane is inserted into a groove of the spacer.

12. A method comprising utilizing a spacer according to claim 1 in an insulating glazing including an electrically switchable functional element.

13. The spacer according to claim 1, wherein the ribbon cable is adjacent two polymeric layers or one polymeric layer and the polymeric main body.

14. The insulating glazing according to claim 9, wherein the electrical connection cable makes electrically conductive contact with the electrically switchable functional element via a spring contact.

15. The method according to claim 12, wherein the electrically switchable functional element is a suspended particle device (SPD), a polymer dispersed liquid crystal (PDLC), an electrochromic, or an electroluminescent functional element.

* * * * *